April 4, 1939.  A. O. MICKELSON ET AL  2,153,096
COUPLER
Filed Oct. 16, 1937
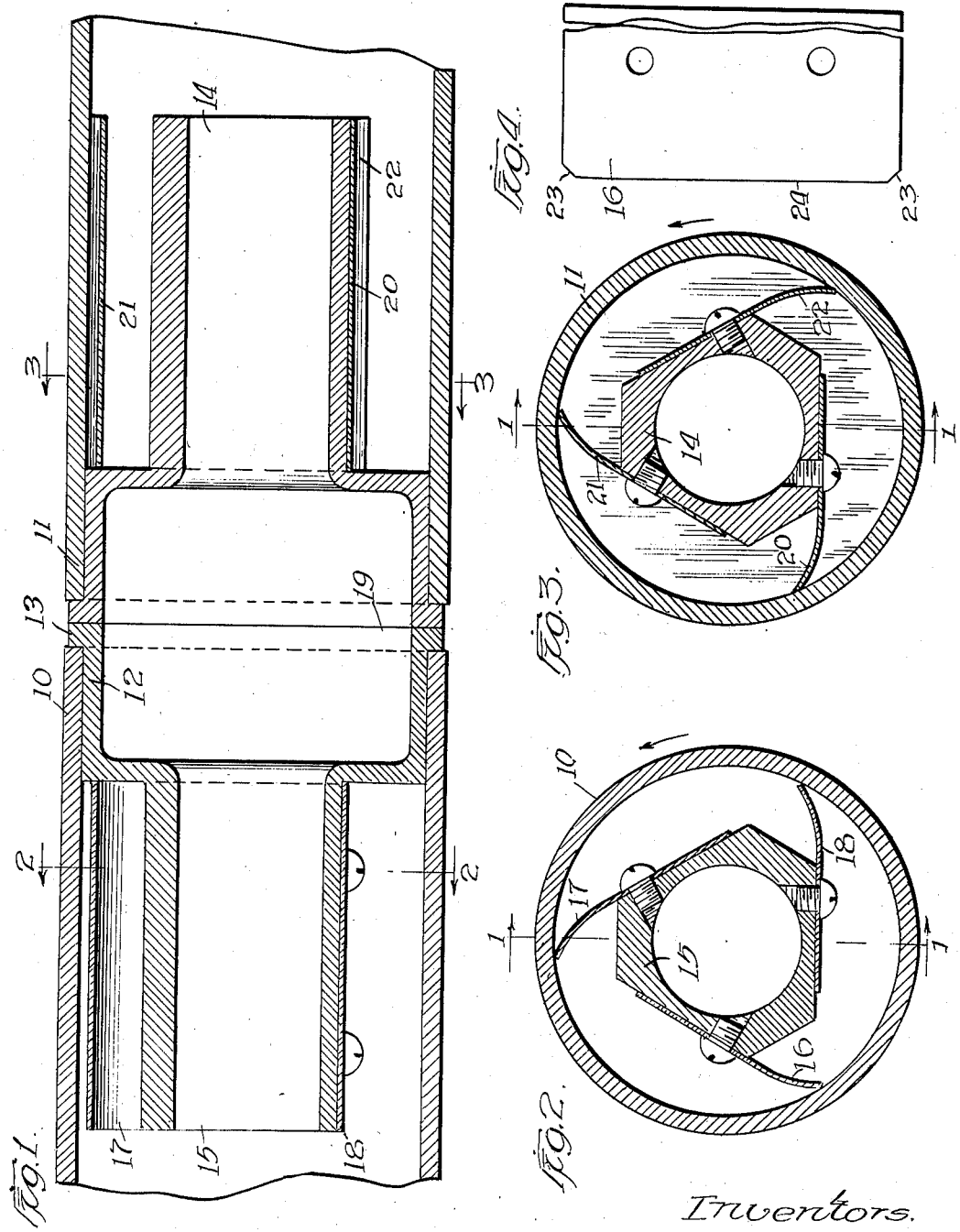
Witness:
Harry R L White
Inventors.
Alfred O. Mickelson
Alexander J. Duaei
By George H. Simmons Atty.

Patented Apr. 4, 1939

2,153,096

UNITED STATES PATENT OFFICE 2,153,096

COUPLER

Alfred O. Mickelson, Chicago, and Alexander J. Duaei, Lombard, Ill.

Application October 16, 1937, Serial No. 169,371

9 Claims. (Cl. 285—1)

This invention relates to a coupler for temporarily connecting two pipes in axial alignment in such a manner that both axial thrust and torque may be transmitted from one pipe to the other, and the principal object of the invention is the provision of a new and improved coupler of this type.

Another object of the invention is to provide a simple, rugged, temporary coupler that can be manufactured at low cost and that may be subjected to hard usage without damage.

Still another object of the invention lies in the provision of a coupler of the class described that may be connected to the pipes and removed therefrom without the use of tools.

Further objects of the invention not specifically mentioned here will be apparent from the detailed description and claims which follow, reference being had to the drawing in which a preferred embodiment of the invention is shown by way of example and in which:

Figure 1 is a cross-sectional view taken along a vertical plane through the longitudinal axis of the coupler;

Figure 2 is a cross-sectional view taken along the line 2—2 of Figure 1 looking in the direction of the arrows;

Figure 3 is a cross-sectional view taken along the line 3—3 of Figure 1 looking in the direction of the arrows; and Figure 4 is a plan view of a torque transmitting spring.

In the operation of pipe coating and wrapping machines, such as for example machines of the type shown in our prior Patent No. 2,048,557, issued July 21st, 1936, the pipe is fed through a propelling mechanism which rotates the pipe and simultaneously advances it longitudinally of its axis. The pipe is extruded from the propelling mechanism through a coating and wrapping mechanism and thence out of the machine. At the instant that the trailing end of the pipe leaves the propelling mechanism, it still has several feet to travel through the machine, during which travel it must be rotated and simultaneously advanced longitudinally a fixed distance per revolution if the coating and wrapping operations are to be continued. This result is accomplished by connecting the trailing end of the pipe to the leading end of the succeeding pipe by a coupling which maintains the pipes in axial alignment, transmits an axial thrust from the trailing pipe to the leading pipe and transmits torque from the trailing pipe to the leading pipe. By this arrangement, the trailing pipe, which is in contact with the propelling mechanism is made to drive the leading pipe, which has passed therebeyond. The present invention relates specifically to a coupler adapted to such a use, although the coupler herein disclosed may equally well be put to other uses.

It will be apparent to one skilled in the art that a coupler which may be successfully used under the foregoing circumstances must be one that can be inserted in the trailing end of the leading pipe and later into the leading end of the trailing pipe while both pipes are in motion both longitudinally of their axes and are rotating thereabout. Furthermore, the coupler must be capable of establishing a connection between the two pipes rapidly and without the use of tools if the coating and wrapping machine is to be operated continuously.

Referring now to the drawing in more detail, in Figure 1 we have shown the trailing end 10 of the leading pipe that is to be driven by the coupler and the forward end 11 of the trailing pipe, which serves as a driving means. The coupler comprises a generally cylindrical member 12, whose outer surface is adapted to fit accurately within the pipe so as to maintain the pipes 10 and 11 in axial alignment. Centrally located in the outer face of the cylindrical member 12 is a collar 13 against which the ends of pipes 10 and 11 abut to permit the transmission of thrust from the pipe 11 to the coupler and from the coupler to the pipe 10. The outer periphery of the collar 13 coincides with or is slightly below the outer surface of pipe ends 10 and 11, so that there are no projections extending beyond that surface to interfere with the travel of the pipe through the coating machine. As shown in the drawing, the outer edge of the collar is slightly below the outer surface of the pipe to illustrate that in no event should the edge of the collar extend beyond the outer surface of the pipe.

The cylindrical member 12 of the coupler contains projections 14 and 15 which are centered upon the longitudinal axis of the coupler. As will be seen in Figures 2 and 3, projections 14 and 15 are of hexagonal section and provide three mounting faces.

Torque transmitting springs 16, 17 and 18 are attached to the projection 15 by screws and extend outwardly therefrom, and similar springs 20, 21 and 22 are attached to projection 14 in a similar manner. The springs are of such length that their outer edges are positioned from the axis of the coupler a distance slightly greater than the inside radius of the pipe. The mounting faces of the projections 14 and 15 are sloped so that the spring is set at an angle with respect to the inside surface of the pipe and the edge of the spring is outermost in readiness to engage the pipe.

As shown in the drawing, the cylindrical portion 12 and projections 13 and 14 are hollow so as to reduce the weight of the coupler. In couplers adapted for connecting smaller pipe sizes, the coupler may well be made of solid parts since the weight of such parts will not be excessive. As shown in the drawing, the coupler is formed of two identical castings which are joined on a median line 19 in any preferred manner such as by welding, this construction being shown by way of example as it will be apparent to one skilled in the art that other types of construction may well be used within the teachings of the invention.

As will be seen in Figure 4, in which a portion of spring 16 is shown as a typical example of the springs 16 to 22, inclusive. The corners of these springs are chamfered slightly as shown at 23 on opposite ends of the pipe engaging edge 24 so as to permit the springs to be inserted readily into the ends of the pipes. The thickness of the springs will vary with the size of pipe that the coupler is adapted to handle, the larger size pipes using a thicker spring since more torque is required to be transmitted.

In the operation of the coupler, projection 15 and the springs carried thereby will first be inserted in the trailing end 10 of the leading pipe, the pipe being at the time rotated in a counterclockwise direction as seen in Figure 2 by the propelling mechanism. Since the free ends of the springs 16, 17 and 18 are disposed on a cylinder of diameter slightly greater than the inside diameter of the pipe 10, the springs must be bent in the manner shown in Figure 2 in order to be fitted within the pipe. The chamfered ends 23 of these springs permit the coupler to be started into the pipe and it will be apparent that by moving the coupler clockwise with respect to the pipe, the springs will be bent so as to fit them within the pipe. Since the pipe is rotating in a counterclockwise direction, it is only necessary to hold the coupler against rotation for an instant so that the springs will be bent by the movement of the pipe to permit the coupler to be inserted.

The trailing pipe 11 is then brought up into engagement with the projection 14 of the coupler and the trailing pipe is rotated clockwise with respect to the coupler so as to bend the springs 20 to 22, inclusive, in the manner shown in Figure 3. Since the coupler is at the moment carried by the leading pipe 10, which is rotating in a counterclockwise direction, it is only necessary to hold the trailing pipe 11 against rotation for an instant to cause the springs to be bent by the movement of the coupler.

The trailing pipe is then fed forwardly by hand until it is engaged by the driving rolls of the propelling mechanism at which time the coupler starts to function.

As torque is applied to the trailing pipe 11 by the propelling mechanism in the manner more fully brought out in our above mentioned patent, pipe 11 tends to rotate in a counterclockwise direction with respect to the coupler and the curved ends of springs 20 to 22 are caused to bite into the pipe and torque is transmitted from the pipe through these springs to the coupler. At the leading end of the coupler, this torque is transmitted through springs 16, 17 and 18 to the pipe 10, the springs tending to bite into the inside of the pipe 10.

The forward thrust placed upon pipe 11 by the propelling mechanism will be transmitted through the collar 13 to the pipe 10 which is abutted thereagainst, the outer surface of the cylindrical portion 12 of the coupler holding the pipes in axial alignment so that the trailing end 10 of the leading pipe will not wobble unduly in its travel through the coating and wrapping parts of the machine.

As soon as the leading pipe 10 has passed the wrapping part of the machine, the pipe is moved forwardly at an increased speed to uncouple it from the trailing pipe, and the coupler is removed from the leading end of the trailing pipe in readiness for insertion in the trailing end of that pipe.

From the foregoing it will be apparent that we have devised a coupler that is possessed of many advantages. It is of simple, rugged construction and not likely to be broken should it be accidentally dropped on or bumped against a part of the machine. It may be inserted quickly into the pipes to couple them together and when properly inserted keeps the ends of the pipe in proper axial alignment. No special tools are required in the operation of the coupler.

While we have shown and described our invention by describing its application to a pipe coating machine, we have done so by way of example only as it will be apparent to one skilled in the art that the invention may be put to other uses.

Having thus complied with the statutes and shown and described a preferred embodiment of our invention, what we consider new and desire to have protected by Letters Patent is pointed out in the appended claims.

What is claimed is:

1. In a coupler adapted to connect two pipes with their axes in alignment and to transmit thrust and torque from the one pipe to the other, torque transmitting means adapted to fit within the pipes and to automatically establish a driving connection therewith, a single aligning means adapted to fit within both of the pipes between said torque transmitting means and the ends of the pipes and thrust transmitting means adapted to engage the ends of the pipes.

2. A one-piece coupler adapted to be fitted into the end of one pipe and be driven thereby and to be fitted into the end of a second pipe and to drive said second pipe comprising torque transmitting means adapted to automatically establish driving connections with the inside surfaces of the pipes when registered therewith and a thrust transmitting collar adapted engage the ends of both of the pipes, the free edge of said thrust transmitting collar being substantially flush with the outside surfaces of the pipes so as to leave said outer surfaces unobstructed.

3. A coupler for temporarily joining two pipes so as to enable one of the pipes to rotate the other pipe and simultaneously advance it longitudinally comprising, a one-piece coupler body adapted to fit within the two pipes that are to be joined, a collar encircling said body and against which the ends of said pipes abut, and automatically operated means on said body engaging the inside surfaces of the pipes and adapted to transmit torque.

4. A coupler for joining two pipes so as to enable torque and axial thrust to be transmitted from one pipe to the other comprising, a cylindrical member adapted to fit within the pipes, a collar encircling said member and adapted to abut the ends of the pipe to transmit axial thrust therebetween, projections extending axially from said member, and leaf spring torque transmitting means fixed on said projections and engaging the inside surfaces of the pipes.

5. A coupler for joining two pipes so as to enable torque and axial thrust to be transmitted from one pipe to the other comprising, a cylindrical member adapted to fit within the pipes, a collar encircling said member and adapted to abut the ends of the pipe to transmit axial thrust therebetween, projections extending axially from said member, leaf spring means on one of said projections engaging the inside surface of one pipe and adapted to transmit torque from said one pipe to the coupler, and leaf spring means on the other one of said projections engaging the inside surface of the other pipe and adapted to transmit torque from said coupler to said other pipe.

6. A coupler for joining and aligning two pipes and adapted to transmit torque and axial thrust from one pipe to the other comprising, a cylindrical member having an outer face adapted to register with the inner faces of the pipes to align the pipes axially, means on said member engaging the ends of the pipes and adapted to transmit axial thrust from one pipe to the other, projections extending into the pipe axially from said cylindrical member, and torque transmitting means on said projections for automatically engaging the inside surfaces of the pipes.

7. A coupler for aligning two pipes end to end and for transmitting axial thrust and torque therebetween comprising, a cylindrical member adapted to fit inside the pipes to align them axially, a collar extending radially from said member and adapted to engage the ends of the pipes to transmit thrust therebetween, projections centered on the axis of said cylindrical member and extending from the ends thereof, said projections being of hexagonal section and having three mounting faces disposed 120 degrees apart, and a torque transmitting spring fixed on each of said mounting faces and extending therefrom.

8. A coupler for aligning two pipes end to end and for transmitting axial thrust and torque therebetween comprising, a cylindrical member adapted to fit inside the two pipes to align them axially, a collar extending radially from said member and adapted to engage the ends of the pipes to transmit thrust therebetween, projections centered on the axis of said cylindrical member and extending from the ends thereof, said projections being of hexagonal section and having three mounting faces disposed 120 degrees apart, and a torque transmitting leaf spring mounted upon each of said mounting faces extending therebeyond, and chamfers on the edges of said springs, the free ends of said springs being disposed a distance radially from the axis of said coupler greater than the radius of said cylindrical member, said chamfers engaging the pipe and flexing the spring as the coupler is registered with the pipe.

9. A coupler for aligning two pipes end to end and for transmitting axial thrust and torque therebetween comprising, a cylindrical member adapted to fit inside the pipes to align them axially, a collar extending radially from said member and adapted to engage the ends of the pipes to transmit thrust therebetween, projections centered on the axis of said cylindrical member and extending from the ends thereof, said projections being of hexagonal section and having three mounting faces disposed 120 degrees apart, and a torque transmitting leaf spring mounted upon each of said mounting faces and extending therebeyond, said springs being disposed at an angle with respect to a pipe to present a sharp edge for automatically biting into the pipe to transmit torque.

ALFRED O. MICKELSON.
ALEXANDER J. DUAEI.